United States Patent [19]

Ferroglio et al.

[11] 4,137,425

[45] Jan. 30, 1979

[54] BIALPHABETIC TELEPRINTER FOR TEXTS IN LATIN AND ARABIC CHARACTERS

[75] Inventors: Luigino Ferroglio, Ivrea; Umberto Ratti, Turin, both of Italy

[73] Assignee: Ing. C. Olivetti & C., S.p.A., Turin, Italy

[21] Appl. No.: 843,280

[22] Filed: Oct. 18, 1977

[30] Foreign Application Priority Data

Nov. 3, 1976 [IT] Italy .............................. 69632 A/76

[51] Int. Cl.[2] ........................ B41J 5/00; G06K 15/02; H04L 15/24

[52] U.S. Cl. .................................. 178/30; 178/23 R; 400/111

[58] Field of Search .................. 197/1 A, 98, 99, 100; 340/324 A, 324 AD; 178/30, 26 R, 26 A, 23 R, 17.5; 364/900; 400/109, 111

[56] References Cited

U.S. PATENT DOCUMENTS

| | | | |
|---|---|---|---|
| 2,940,575 | 6/1960 | Khalil | 197/1 A |
| 3,665,450 | 5/1972 | Leban | 340/324 A |
| 3,938,099 | 2/1976 | Hyder | 197/1 A |
| 3,998,310 | 12/1976 | Chaudhry | 197/1 A |
| 4,041,482 | 8/1977 | Van Osten | 178/30 |

FOREIGN PATENT DOCUMENTS

| | | | |
|---|---|---|---|
| 2240613 | 7/1975 | France | 197/1 A |

OTHER PUBLICATIONS

Palmer: "Typewriter with Reversible Writing Line," IBM Tech. Dis. Bulletin, vol. 14, No. 4, Sept. 1971, pp. 1152–1157.

*Primary Examiner*—Thomas A. Robinson
*Attorney, Agent, or Firm*—Schuyler, Birch, Swindler, McKie & Beckett

[57] ABSTRACT

The teleprinter is provided with a bialphabetic keyboard, for example latin and arabic, and a dot printing head controlled by two different character generating units corresponding to the two alphabets. The teleprinter is normally predisposed for one of the two alphabets and can be switched to the other alphabet by means of a sequence of characters. The arabic character generating unit is adapted to recognize predetermined sequences for generating composite characters, i.e. the lam-alef group. Furthermore, some characters at the end of a word are generated by adding a tail to the normal character in response to the spacing code. The teleprinter can be connected to the conventional existing teleprinters, since neither the composite characters, nor the tails are transmitted on the line.

17 Claims, 9 Drawing Figures

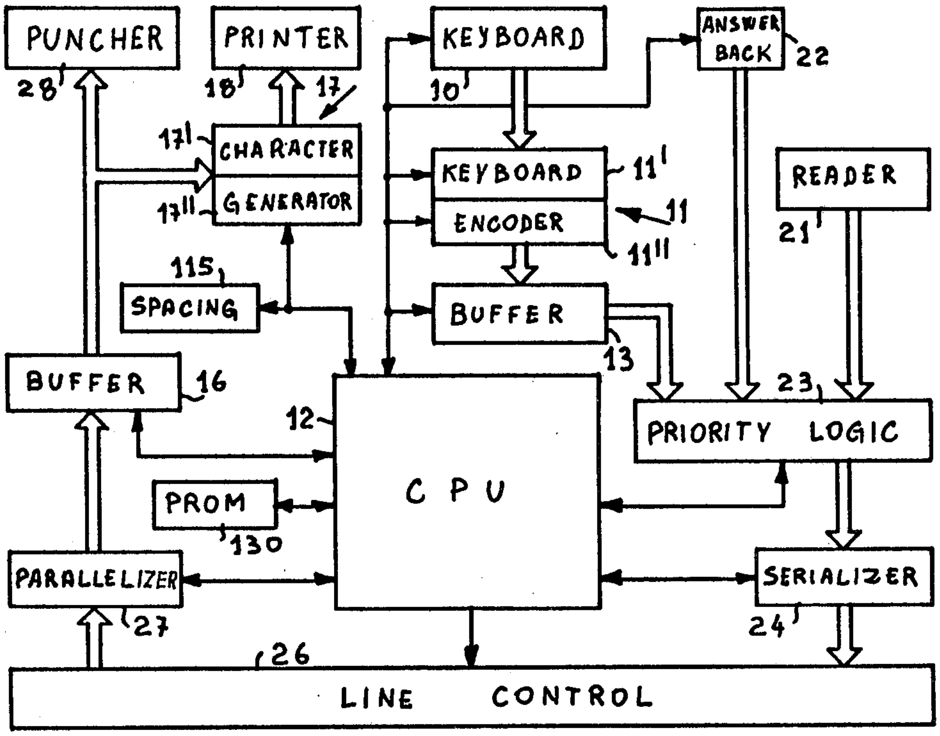
FIG.3
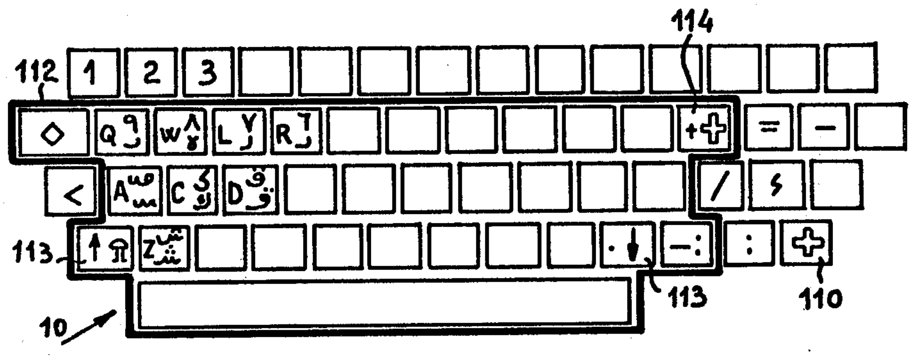

BIALPHABETIC TELEPRINTER FOR TEXTS IN LATIN AND ARABIC CHARACTERS

BACKGROUND OF THE INVENTION

This invention relates to a teleprinter for texts in alphabets of latin and arabic characters, including an alphanumeric keyboard, a printer adapted to print selectively in either of said two alphabets, and letter spacing means.

Normally for telecommunications in the two alphabets, each teleprinting station must be provided with two separate apparatus adapted to be selectively connected to the network of the teleprinting system. There are also known dot printers adapted to be controlled so as to print selectively according to either of two alphabets.

One object of the invention is to provide a bialphabetic teleprinter, wherein the alphabet can be selected through the network.

According to the invention, we now provide a bialphabetic teleprinter of the above kind, which is characterized by means for recognizing sequences of signals to condition the teleprinter to operate both in sending and receiving according to one of said alphabets and to condition said spacing means to accordingly select the direction of letter spacing movement.

The invention includes also an improved device for generating and either displaying or printing characters of alphabets of arabic type, for example Farsi, Urdu, Pakistani, etc.

As known, the alphabet of these languages, having a limited number of phonetic letters, generally 28 letters, presents a great variety of written characters, since many letters are normally written in different forms according to whether they are placed at the beginning of the word, in the body of the word, at the end of the word, or isolated. Moreover, these languages present various syllabic combinations, in which the syllabic components differ from the corresponding letters either isolated or combined with other signs. For instance the syllable constituted by the letter "1" (1am) and by the letter "a" (alef) presents a form in which the letter "a" is deformed and intertwined with the letter "1," as will be better seen hereinafter.

With the development of office machines in general, and of the typewriter in particular, it has been sought to simplify the arabic alphabet writing, by drastically reducing the number of written characters to the detriment of the writing refinement, so as not to increase the complexity of the keyboard or the number of keys available to the operator.

In the conventional typewriters some characters of the alphabet can be written only in two different forms: one for the characters in the body of the word and the other for the end-of-the-word characters, while for the syllable "1*a*" a special key is often foreseen, which commands the writing of the syllable with a unique writing character.

In such typewriters generally the two forms of the same letter are written by depressing the same key, upon operating a shift key, as occurs for the capital and small letters of the latin alphabet.

Since the letters have, in the end-of-the-word form, a width considerbly larger than in the other letters, such typewriters are normally provided with a variable spacing device, generally able to command, besides the normal spacing, a double-spacing corresponding to this end-of-the-word letter.

In the teleprinter fields, arabic language writing has been further sacrificed to the limit of intelligibility, because of the reduced number of codes in the 5 bit telegraphic system. As known, this codification can give only 32 combinations, which are doubled with the use of the shift. However, since many codes are used for the numerals, for punctuation and special signs and for the various machine functions, it is not possible to obtain two writing forms of the arabic alphabet letters, such as has been relinquished for the lower case letters in the latin alphabet.

The problem of arabic alphabet teleprinters is also found again in the printers and displays of other apparatus, such as electronic calculators, accounting systems, terminals for data transmission, in which the characters are generally identified by code signals, the number of which is limited.

Various apparatus have been proposed to improve the writing of arabic languages by office machines. In a known proposal for typographic composing machines for arabic texts the signals given by a tape reader are sent simultaneously to a memory and to a shift register connected to this memory. In such a way the memory presents the recording of a character sequence, which is used to define the form that one character must have on the basis of its position in the word, the possible connection signs between the letters, and the spacing corrections to justify the end of line, which is the left end in the arabic writing. This proposal, however, is too sophisticated and not suitable for office machine printers because of the high number of characters and keys needed.

In another known printer, the letters having two forms are represented by a short character and a long character. A memory comprising two registers stores a sequence of two characters, while a decoding circuit recognizes when a space is found in one of the two registers, in order to choose for the letter of the other register the long character instead of the short character. This proposal also requires a very large number of characters, substantially equal to those of a typewriter, and the possibility of letter spacing the carriage one or two steps according to whether a short or a long character is printed. Therefore, this solution is not suitable for printers controlled by code combinations in general and for teleprinters in particular. Furthermore, this printer does not allow obtaining the syllabic characters, such as the arabic syllable "1*a*", in which a part of the character, at least, differs from the corresponding letter when it is placed in other sequences.

Accordingly, another technical problem solved by the invention is to create a display or text printing device in arabic characters, which does not require any added code for the output of the additional characters and which reduces these characters to a minimum.

SUMMARY OF THE INVENTION

This technical problem is solved by the display or text printing device in arabic characters according to the invention, wherein the characters are individually defined on the basis of corresponding input signals, and wherein the logic means are adapted to modify a predetermined input signal according to a preceding character of a group of characters in the text, said device being characterized in that said logic means comprise memory means for storing the occurred output of predetermined characters, and substitution means being conditioned by said memory means when storing said occurred output for substituting in said predetermined input signal the signal corresponding to an additional character.

According to a preferred embodiment of the invention, in which the predetermined signal corresponds to a character indicating the end of the word, the additional character is constituted by a sign bound to the preceding character, whereby a predetermined input signal produces a different output according to whether the preceding character is placed in the body of the word or at the end of the word.

According to another embodiment of the invention, the predetermined input signal corresponds to a portion of a bound syllable, control means being provided to command the partial return of the display or writing point before the output of said syllable portion.

It is thus evident that the number of codes or signals necessary to command the display or printer is not increased by additional characters and that the length of the line is not changed by these additional characters.

BRIEF DESCRIPTION OF THE DRAWINGS

These and other characteristics of the invention will become apparent from the following description of the invention, made by way of example, not limitative, in conjunction with the annexed drawings, in which:

FIG. 1 is a block diagram of an electronic teleprinter incorporating a printing device according to the invention;

FIG. 3 is a keyboard layout of the teleprinter;

DESCRIPTION OF THE PREFERRED EMBODIMENT

Figure 2:
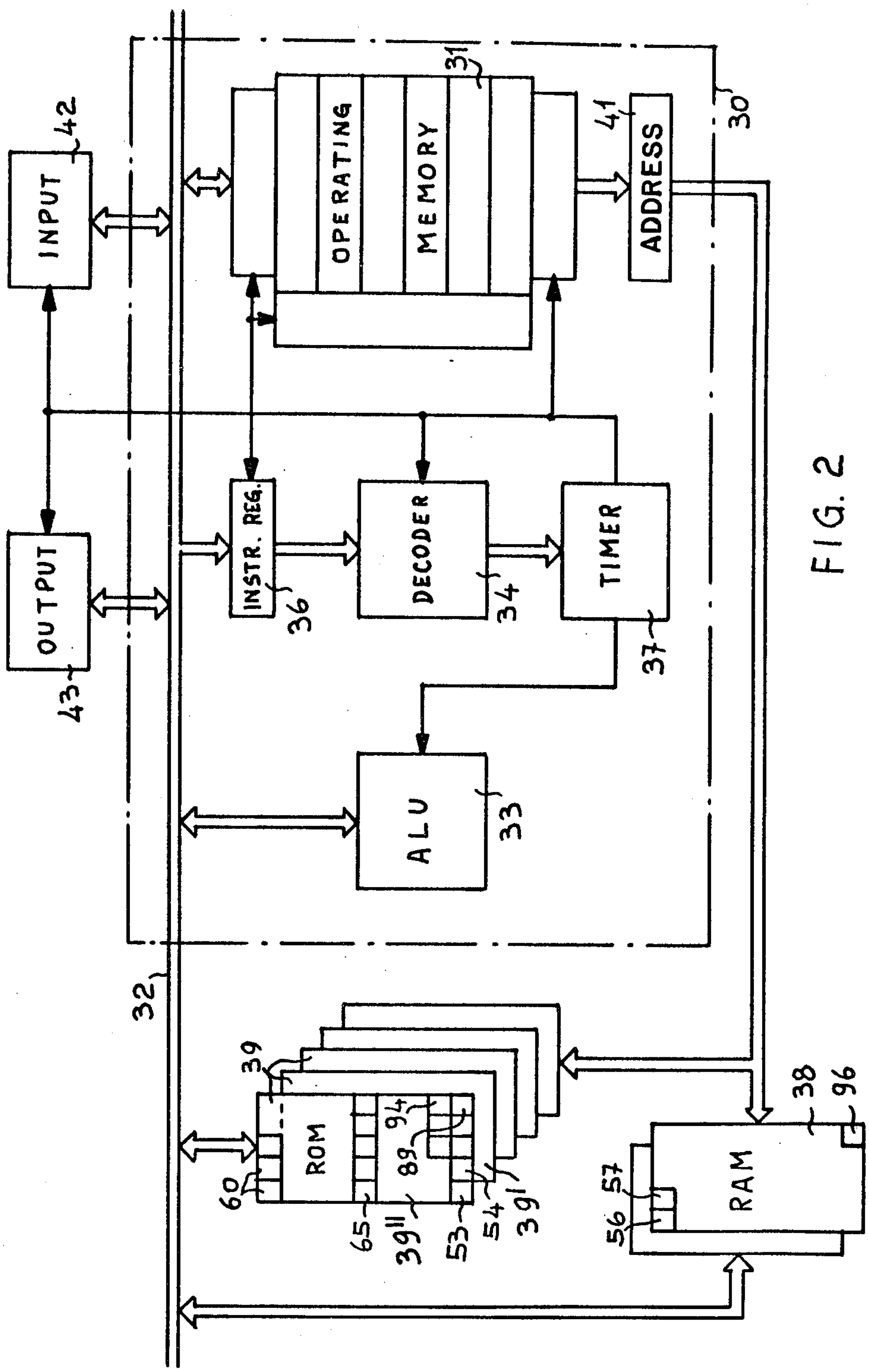
FIG. 2 is a diagram of the central unit of the teleprinter.

The display device or text printer in arabic characters according to the invention, can be applied to a data or text processing system, or to a teleprinter comprising a keyboard 10, the characters of which are coded by a keyboard encoder 11 and sent character by character to a central unit 12 through an input buffer memory 13. The central unit 12 in turn sends the results or the processed text, character by character, to an output buffer memory 16. This buffer memory, through a character generating unit 17, causes the data output, through a printer 18 or a display of the alphanumeric type.

In the teleprinter, the input of the text to be transmitted can be effected, other than through the keyboard 10, the encoder 11 and the buffer memory 13, also through a punched tape reader 21, or an answer back device 22 to transmit automatically the name of the station. The text furnished by the reader 21 and by the device 22 is already coded as the one furnished by the memory 13. The text to be transmitted, coming from the three sources 13, 21 and 22, is sent, character by character through a priority logic 23, to a serializer 24 which, through a line control unit 26, transmits in series the code combination of each character on the line.

In reception, the code combination of the line are sent through the unit 26 to a parallelizer 27, which sends in this way the text received character by character to the output buffer memory 16. The memory 16 can directly control a tape puncher 28, for punching the codes of the text, or, through the unit 17, can control the printer 18.

The central unit 12 of the teleprinter of FIG. 1 is of the microprogrammed type and controls the operations of the individual units including the encoder 11, the memories 13 and 16 and the unit 17. In particular, the cenral unit 12 comprises a micro-processor, generically indicated by the numeral 30 (FIG. 2), which is constituted by an operating memory 31, having a series of operating registers, which can be selectively connected to a internal bus 32 of the data, and an arithmetic and logic unit 33 also connected to the bus 32. A decoder 34 of microinstructions, sent one by one through the bus 32 and an instruction register 36, generates a series of commands, which are executed by the various units of the microprocessor 30, under the control of a timer 37.

The central unit 12 comprises moreover a read-write memory or RAM 38, organized in a plurality of registers, and a read-only memory or ROM 39, organized in a plurality of pages and containing fixed data and microprogrammmes for the operation of the microprocessor 30. Part of the RAM 38 constitutes the memories 13 and 16 of the teleprinter, while part of the ROM 39 and of the microprocessor 30 constitutes the character generating unit 17, as will be better seen hereinafter.

The RAM 38 and the ROM 39 are addressed by an address register 41 and are connected to the bus 32. Finally, the central unit 12 comprises an input interface 42 and an output interface 43 for the connection to the other units of the teleprinter.

According to the invention, the printer 18 can be controlled for printing texts in characters of two different alphabets, for instance the latin alphabet and an alphabet of the arabic group, including Farsi, Urdu, Pakistani, etc.

The keyboard 10 (FIG. 3) is formed by superimposing a standard keyboard for teleprinters operating in latin characters and a standard keyboard for teleprinters operating in arabic characters. Particularly, the keyboard 10 comprises four rows of keys, which provide the latin characters of the No. 2 International alphabet of the CCITT. Since the corresponding telegraphic code is of the five bit type, the central unit 12 (FIG. 1) each time automatically inserts, in a known manner through a portion 11' of the encoder 11, the shift codes LTRS and FGRS, which are necessary for the transmission. During the operation in latin alphabet all the alphanumeric keys are enabled for the transmission. Particularly, the key 110 "Who are you?" (FIG. 3) for requesting the automatic answer back, which is included in the group of codes of the shift FGRS, generates the same five bit code 10010 of the D key.

The keyboard of the arabic alphabet is of the compact type having three rows of keys, without any automatic insertion of the shift codes. The three row portion of the keyboard 10 is encircled in FIG. 3 by a continuous heavy line, indicated by the nuneral 112. Therefore, each key of this portion of the keyboard 10 provides one latin character and two arabic characters. The keyboard includes also two shift keys 113, which operate as shift only when the teleprinter operates in an arabic alphabet, whereas when the teleprinter operates in latin alphabet, they control other functions or printing of specific characters. In this case the keys not encircled by the line 112 remain ineffective. The arabic characters are encoded by a second portion 11″ of the encoder 11 (FIG. 1).

In the arabic alphabet, the key "Who are you?" is formed by the key 114 (FIG. 3) which is not associated with any character of the arabic alphabet, whereby it automatically generates the code FGRS, when it is required. The corresponding five bit code (01000) is the same of the sign >≡ of the group of codes of the shift LTRS.

The answer back device 22 (FIG. 1) includes a pair of PROM components, which are so programmed as to contain two different sequences of twenty characters each, one sequence for naming the teleprinting station in latin characters and the other for naming it in arabic characters.

Figure 4:
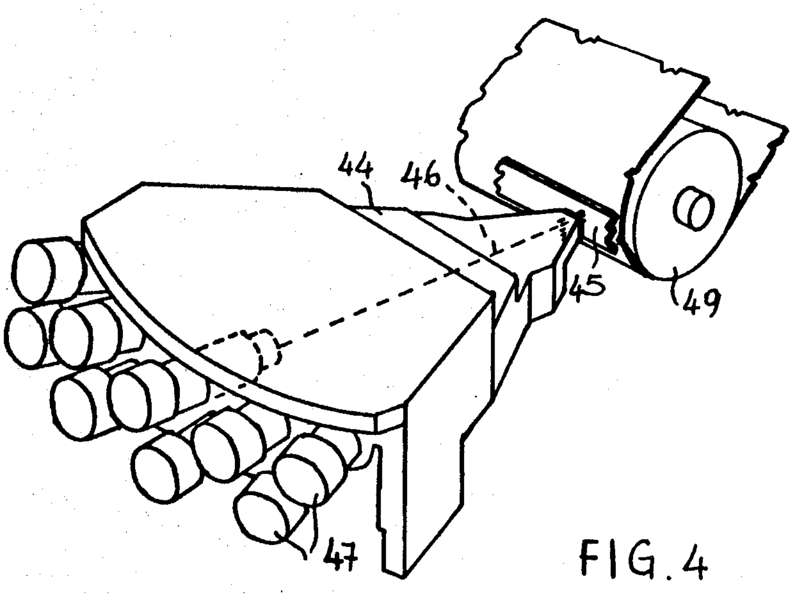
FIG. 4 is a schematical perspective view of a dot printing device of the teleprinter.

The printer 18 comprises a printing head 44 (FIG. 4) having nine needles 46, the writing ends of which are placed on a vertical row. The needles 46 are operated individually, by corresponding lectromagnets 47 energized through electrical connectors. A paper carrying platen 49 is placed in front of the head 44. The needles 46 print on the paper through an inked-ribbon 45. The printing head 44 is transversely moved with respect to the platen 49 by a stepping motor, not shown, which is controlled by a spacing control circuit 115 (FIG. 1) known per se. Since in the arabic alphabet, the text is written from right to left, the spacing control 115 is adapted to cause the printing head 44 to be letter spaced with respect to the platen selectively from left to right and from right to left. The spacing step is constant for each printing character, for instance 2.54 mm. During a spacing step, the electromagnets 47 can be set in 13 different positions, but the same electromagnets cannot be set in two successive contiguous positions. Therefore, the characters are printed according to a 9 × 7 dot matrix, with the possibility of each needle 46 printing in the other six intermediate positions, according to the grid shown for the single characters of FIG. 6.

The direction of the spacing is selected in the circuit 115 by means of the central unit 12 according to the alphabet selected for printing. The circuit 115 selects the direction of the movement of the printing head 44 both during the printing of each character and when a carriage return or a new line function is operated by the teleprinter.

The central unit 12 is also adapted to select in response to the selected alphabet one of two portions 17′ for the latin alphabet and 17″ for the arabic alphabet, included in the character generating unit 17. The portions 17′ and 17″ are adapted to address two corresponding pages 39′ and 39″ of the ROM 39 (FIG. 2) to generate the corresponding characters to be printed. The central unit 12 controls the various units of the teleprinter according to the selected alphabet by executing the micro-instructions of two different microprogrammes, which can be stored either in the ROM 39 or in a suitable PROM. The two programmes are coordinated by a supervisory programme.

Particularly, each programme is adapted to cause the central unit 12 to recognize the code "Who are you?" of the relevant alphabet and to enble the device 22 to transmit the relevant answer back. On the contrary, the code "Who are you?" of the other alphabet is not recognized and therefore the connection in this alphabet cannot be established. Since in this case the connection is not yet established, the teleprinter is not conditioned to print the character which in the selected alphabet corresponds to the "Who are you?" code of the other alphabet.

The teleprinter is normally in a stand by condition, that is, connected to the line. In this condition the teleprinter is ready to be called by other stations, while the alphanumeric keyboard 10 is ineffective, that is electronically locked. In this condition the operator can select a remote station for the connection, for example through a switching central, and thus start the transmission or the conversation. Alternatively, the operator can select the off line operation, wherein the teleprinter remains also ready to be called, but the transmission is locked, while the keyboard is unlocked and allows the operator to prepare a message to be transmitted later, for example by punching same on a tape. This off line operation can be automatically interrupted at any instant by the reception of a call through the switching central. This latter normally connects a plurality of stations, which can operate either in only one of the two alphabets, or selectively in the two alphabets.

The two programmes corresponding to the two alphabets can be selected through an external control, for example a key or a lever of the console, or a predetermined sequence of received characters. The supervisory programme can be normally predisposed for privileging one of the two alphabets, so that when the teleprinter is switched on, it normally selects the relevant programme.

Figure 8:
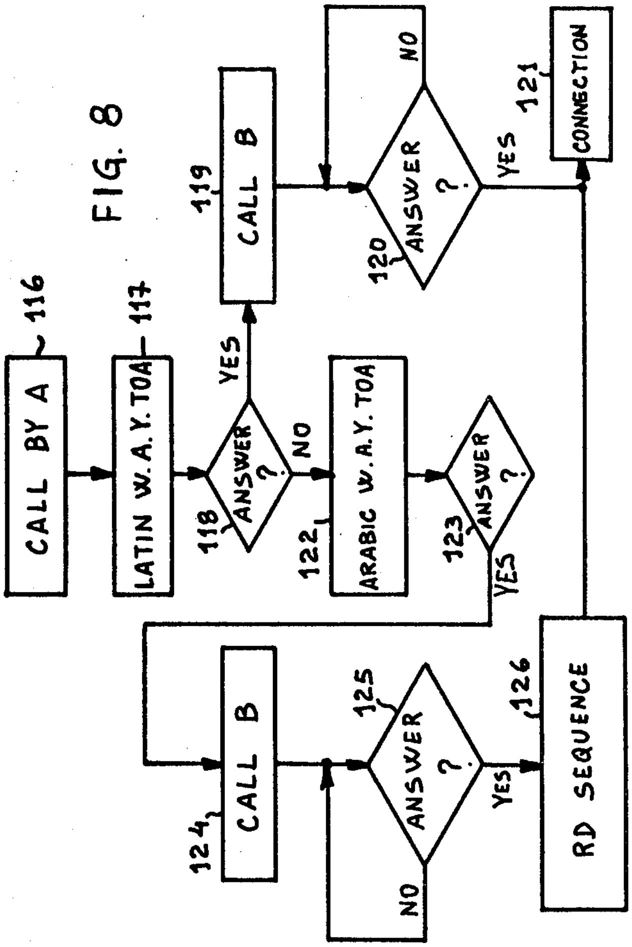
FIGS. 8 and 9 are two flow charts of the operation of the bialphabetic teleprinter.

According to a first embodiment, the teleprinting system includes a plurality of bialphabetic teleprinting stations, adapted to be connected to a switching central and normally predisposed for operating in the latin alphabet. The operator of a station A, wishing to call a remote station B and to operate in one of the two alphabets, predisposes its teleprinter according to the wanted alphabet and sends the call (operation 116 in FIG. 8). The central executes then a routine, which first sends to the station A the code "Who are you?" (W.A.Y.) of the latin alphabet (operation 117). Now the central effects a first logic decision 118 to state whether the calling station A answers back, that is whether it is predisposed in latin. In the affirmative, the central calls the remote station B (operation 119) and effects a second logic decision 120 for stating whether the called station B answers. If the logic decision is yes the connection 121 is established in latin and the conversation is effected. The logic decision 120 is repeated as long as for any reason the station B does not answer back.

On the contrary, if the logic decision 118 is negative, that is if the station A does not answer back, it means that it has been predisposed to operate in the arabic alphabet. After a predetermined delay, the central automatically sends the code "W.A.Y." of the arabic alphabet (operation 122), which is now recognized by the station A. Now a new logic decision 123 on the answer is effected, the result of which is of course positive, thus defining that the calling station A operates in arabic. Now the central calls the station B (operation 124) which is followed by a logic decision 125 similar to the decision 120. When the central receives the answer back from the station B, it sends to the same station B a sequence of characters, for example the two characters RD, which will cause the station B to be predisposed to operate in the arabic alphabet (operation 126). Following this sequence, the connection 121 is established and the conversation is effected.

It is thus clear that, according to this embodiment, the connection is established by the central in the alphabet requested by the calling station and cannot be changed during the conversation unless a new connection is requested.

According to another embodiment of the invention, the teleprinter comprises a PROM 130 (FIG. 1), wherein a latin-arabic selecting routine is recorded for causing the selection of the alphabet both in the off line condition of the teleprinter and in its on line condition in connection with a remote station, under the control of specific sequences of characters. This routine includes the instructions necessary for recognizing the sequences corresponding to the selection of the arabic alphabet, and of the latin alphabet respectively.

To this end, the sequence LLLL is chosen for selecting the latin and the sequence GGGG for selecting the arabic. It is clear that, for this purpose, sequences of other characters or letters can be chosen, provided that they do not correspond to the numerals in the FGRS shift, since these numerals must be used for selecting or calling the number of the remote station.

In turn the supervisory programme, also recorded on the PROM 130, which normally privileges the latin alphabet, can be modified, through a bridge or a shunt on the same PROM 130, which suppresses an instruction, so that the arabic alphabet is privileged.

Figure 9:
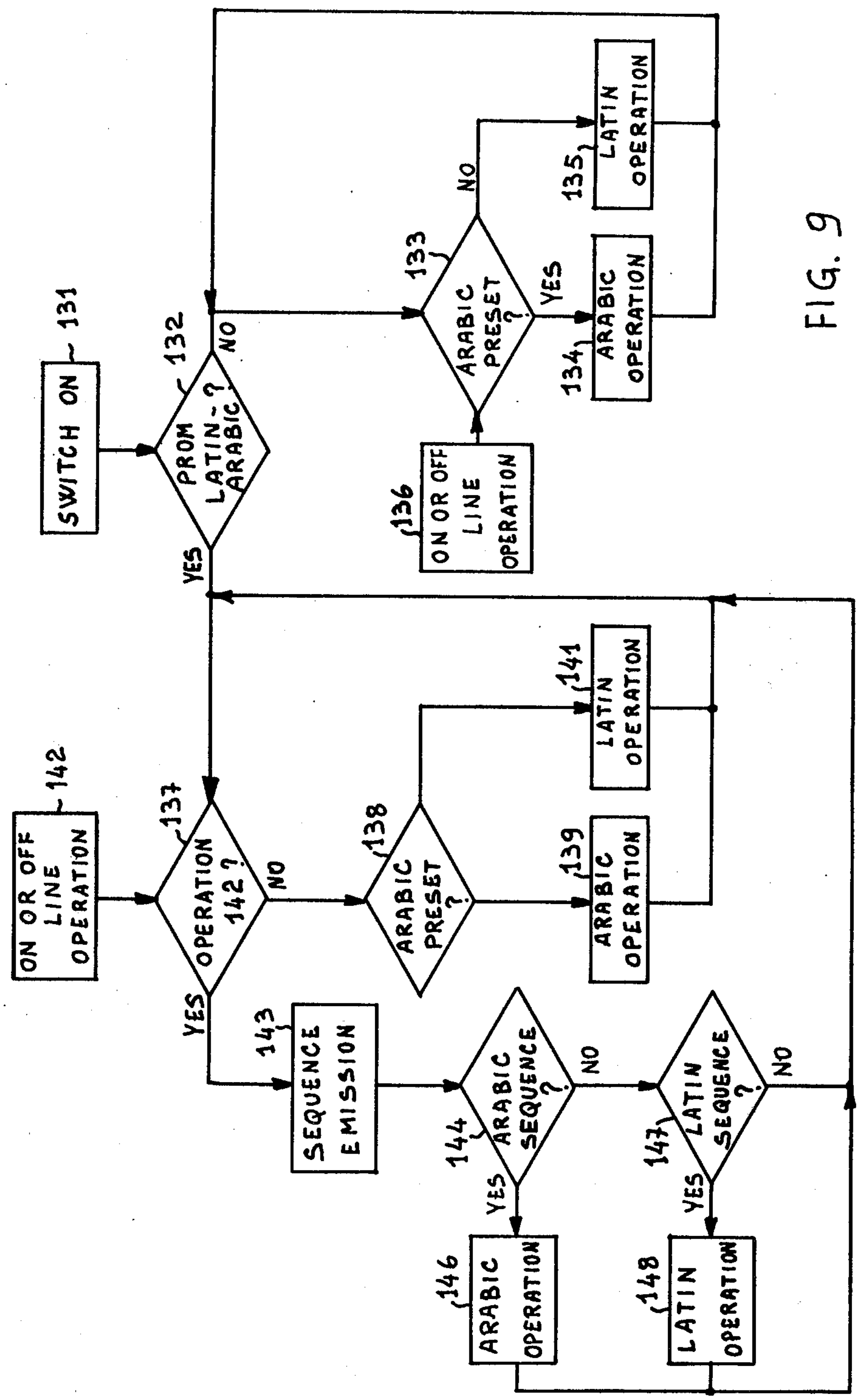

When the teleprinter is connected to the line or network, that is when the teleprinter is switched on (operation 131 in FIG. 9) the supervisory programme of the PROM 130 (FIG. 1) is released. This programme firstly causes a logic decision 132 (FIG. 9) to state whether the selection routine is recorded on the PROM 130. If the decision is negative, that is if the station is not a bialphabetic one or it is not allowed to select that alphabet, a second logic decision 133 is effected to state whether the shunt privileging the arabic alphabet is present. If the decision is affirmative, the teleprinter is conditioned for operating in arabic (operation 134); if the decision is negative it is conditioned for operating in latin (operation 135). The logic decision 133 is continuously repeated till either a command for off line operation, or a connection with a remote station (operation 136) occurs. The logic decision 133 is followed by the operation 134 or 135 only if the requested operation is for the same alphabet allowed for the specific station. At the end of the connection the programme returns again to the logic decision 133.

On the contrary, if the logic decision 132 of the latin-arabic selection routine is affirmative, that is if the station is a bialphabetic one, a logic decision 137 is immediately effected for stating whether the teleprinter is already operating either on line or off line. If the decision is negative, that is the teleprinter is in stand by, another logic decision 138, similar to the logic decision 133, is effected, whereby according to whether the arabic privileging shunt is present or not, the teleprinter is preset for either arabic operation 139 or latin operation 141, that is according to the privileged alphabet.

The two logic decisions 137 and 138 are continuously repeated till either an on line or an off line operation 142 is started. In this case the result of the logic decision 137 is positive and the operator of the local teleprinter or of the remote calling station emits the sequence corresponding to the alphabet chosen by him (operation 143), that is either the sequence LLLL for the latin operation of the sequence GGGG for the arabic operation.

Then a first logic decision 144 is effected for stating whether the emitted sequence is the arabic one. In the affirmative both connected stations are conditioned for operating in arabic (operation 146). If not, a second logic decision 147 is effected and if the result is yes both connected stations are conditioned for operating in latin (operation 148). The result of the logic decision 147 can also be negative, for instance in the case an error occurs in setting up the sequence, or in the case other sequences controlling other operations are set up.

The operations 146 and 148 merely indicate the beginning of the relevant operations, whereby the routine from 137 to 148 are continuously repeated. At any instant the local operator or the one at the connected station, can set up the sequence corresponding to a desired one of the two alphabets (operation 143) and thus switch at will the operation of the teleprinter.

In both the above embodiments, each time a connection in established according to a selected one of the two alphabets, the switching routine causes a carriage return operation to be effected in both connected teleprinters, automatically, under the control of the spacing control circuit 115. Therefore, the printing can start for both teleprinters from the beginning of the line according to the selected alphabet.

The arabic alphabet has generally 28 letters. According to one standardization in use for some time on office machine printers, one group of the 28 letters is always written with the same form, independently of the position within the word, while another group of the 28 letters is written either in a short form, if the letter is at the beginning or in the body of the word, or it is written in a long form, if the letter is isolated or at the end of the word.

Figure 5:
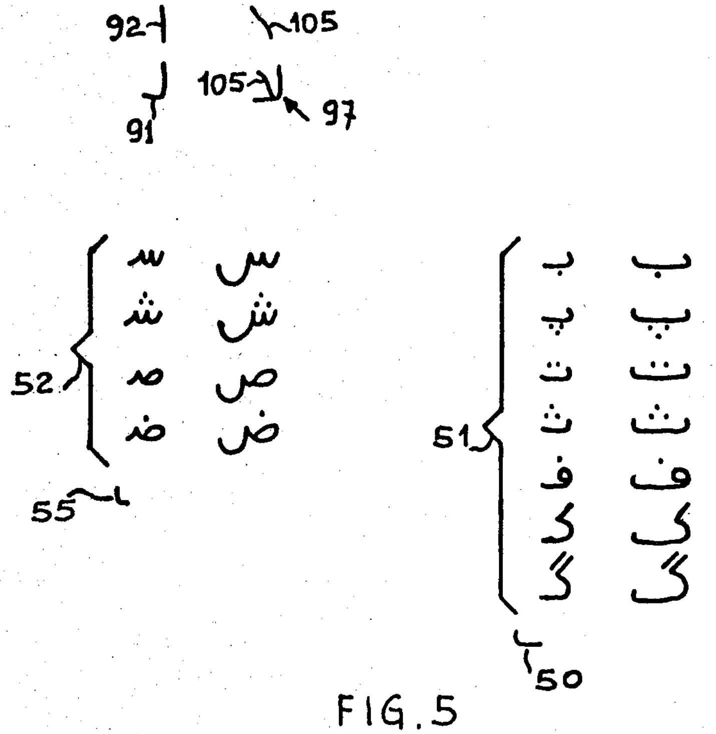
FIG. 5 illustrates the letters which are written in two different forms with the device of FIG. 4.

In the device according to the invention, a group of seven letters, indicated by 51 in FIG. 5, can be written in the left short form or in the right long form. The design of the letters is such that the difference between the long and the short forms consists of adding a first tail or sign 50 bound to the short letter, and equal for all the letters 51. Another group of four letters indicated by 52 can be written in the left shoft form or in the right long form, which differs from the corresponding short form by adding a second tail 55, equal for all the four letters 52.

The individual characters to be written by means of the head 44 are generated by addressing a corresponding portion 60 (FIG. 2) of page 39" of the ROM 39 by means of a signal corresponding to this character, generally a binary code combination. In this portion 60 of ROM 39, the sequence is recorded for controlling the actuations of the individual electromagnets 47 (FIG. 4) during the spacing of the head 44. The space between the words, indicated by a corresponding code combination, addressed generally a portion 65 of ROM 39 (FIG. 2), which does not record any actuation of the electromagnets 47. The portions 60 and 65 of ROM 39 are addressed by the portion 17" of the character generating unit 17 (FIG. 1) in function of the combinations received from the buffer memory 16.

If the characters of the letters 51 and 52 are to be written in the two forms, each one under the control of a corresponding code combination, eleven more code combinations would be necessary, while the ROM 39 should record also the corresponding forms of characters. As is known, in the transmission system for five bit teleprinters, all codes available are used for controlling the printing of the characters or the functions, whereby it is not possible to find more codes for the two forms of the groups of letters 51 and 52.

According to the invention, on the page 39" of the ROM 39 (FIG. 2), two portions 53, respectively 54, are provided, to record the sequences for controlling the actuation of the electromagnets 47 (FIG. 4) to write the two tails 50 and 55 (FIG. 5) of the two groups of letters 51 and 52. The unit 17 (FIG. 1) can address the two portion 53 and 54 (FIG. 2) of the ROM 39, under the control of logic means, which comprise memory means adapt to store the occurred output of predetermined characters. In particular, these memory means comprise a first one bit register 56 of the RAM 38 to store the occurred printing of one of the characters 51 and a second one bit register 57 of the RAM 38 to store the occurred printing of one of the characters 52. Furthermore, the logic means comprise substitution means for substituting for the code of a space between the words, an address signal of the portions 56 or 57 of the RAM 38. These substitution means comprise recognition means of the codes of the letter having two forms and of the spacing code, and comparators included in the unit 33 and controlled by specific microinstructions of a particular character generating control routine, recorded in the ROM 39.

The character generating logic operates as follows:

When the buffer memory 16 presents in output a code combination (block 59 of FIG. 7) a character generating routine is fetched in sequence from the ROM 39 (FIG. 2). The instructions of this routine decoded by the decoder 34 are executed by the individual units of the central unit 12. A first instruction of this routine causes the unit 33 to effect a logic decision 61 (FIG. 7) to establish whether the code that of a printing character or that of a space between the words. If the code belongs to a printing character, another logic decision 62 is effected to establish whether the character belongs to the group of letters 51. If the result is negative another logic decision 63 is effected to establish whether the character belongs to the group of letters 52. If this decision is also negative, an operation 70 is effected, in which the corresponding portion 60 (FIG. 2) generating the control signals of the electromagnets 47 (FIG. 4) is addressed, in order to print the corresponding characters, for instance the character 64 of FIG. 6.

Figure 6:
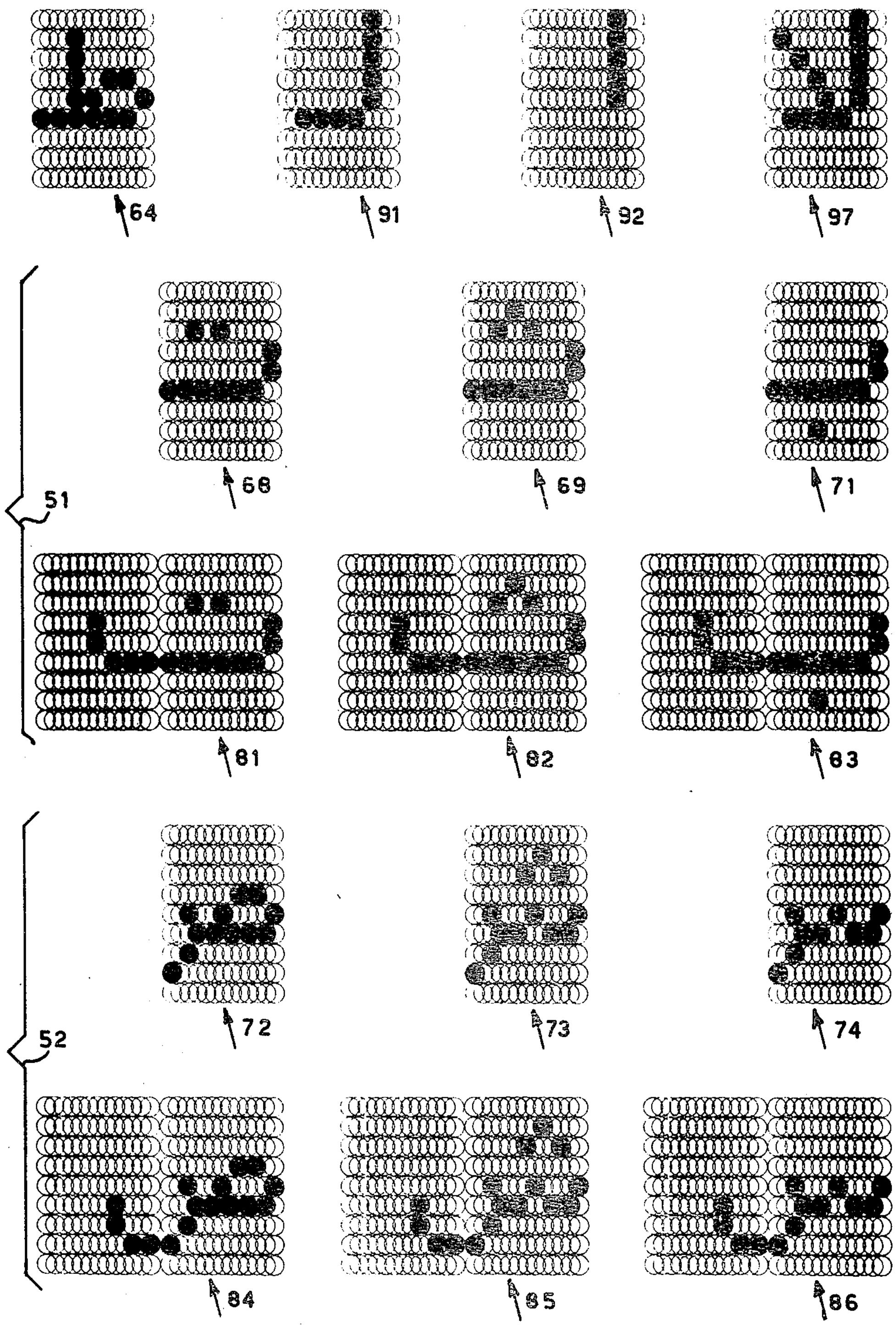
FIG. 6 represents in enlarged scale some characters obtained with the device of FIG. 4.
Figure 7:
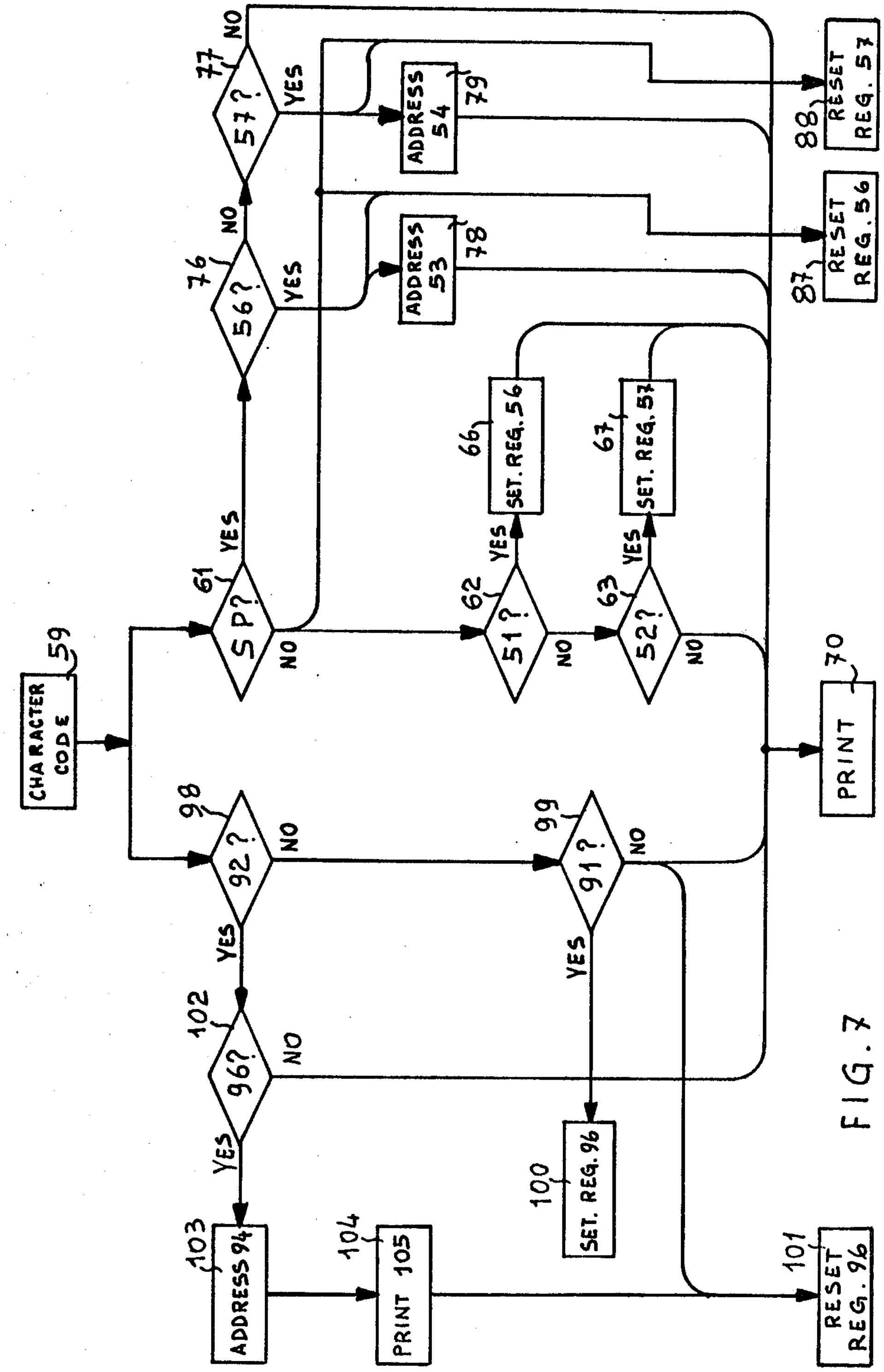
FIG. 7 is a flow chart of the operation of the control unit for the character generation.

On the contrary, if the result of the logic decision 62 (FIG. 7) or the one of the logic decision 63 gives a positive result, a recording operation 66, respectively 67, is effected, by means of which the register 56, respectively 57 (FIG. 2), is set, thus immediately causing the operation 70 (FIG. 7) for the addressing of the portion 60 of ROM 39 (FIG. 2) corresponding to the received code. The printer 18 (FIG. 1) then effects the character printing of the letter 51 or 52 of short form corresponding to the received code, as indicated in FIG. 6 by one of the characters 68, 69 and 71 of the group of letters 51 and by one of the characters 72, 73 and 74 of the group of letters 52.

It is thus clear that the registers 56 and 57 (FIG. 2) can store the occurred output of predetermined characters, without influencing directly the printing of these characters.

On the contrary, if the code read from the memory 16 (FIG. 1) is the spacing code, that is, the result of the logic decision 61 (FIG. 7) is positive, a logic decision 76 is effected to establish whether the register 56 has been set or not. If this decision is negative, that is if the register 56 has not been set, another logic decision 77 for the register 57 is effected. If also this logic decision 77 gives a negative result, that is, if the preceding character does not belong either to the group of letters 51 (FIG. 5) or to group 52, the operation 70 is effected, in which the corresponding portion 65 of the ROM 39 (FIG. 2) is addressed to generate the space between the words without any other influence on the preceding printed character.

If one of the two logic decisions 76 and 77 gives a positive result, it means that the already printed preceding character was one of the group of letters 51, respectively 52. An operation 78, respectively 79, is then effected, for substituting or replacing the address of the portion 65 of ROM 39 (FIG. 2) with the portion 53, respectively 54. In the subsequent operation 70, the portion 53 or 54 generates instead of the space, the corresponding sign 50, respectively 55. This sign is bound to the preceding character, whereby the letter assumes the long form, as indicated in FIG. 6 for the letters 81, 82 and 83 of the group 51 and the letters 84, 85 and 86 of the group 52. Moreover, the positive result of one of the two logic decisions 76 and 77 causes a corresponding reset operation 87, respectively 88, of the relevant register 56, respectively 57 (FIG. 2), thus completing the printing routine of a letter with two forms, when it is at the end of the word.

After one of the two registers 56 or 57 has been set, if the code of another letter to be printed is read from the memory 16, that is, the letter already printed of the group 51 or 52 is not followed by a space, the negative result of the logic decision 61 (FIG. 7) causes also the operation 87, or 88, to reset the set register 56 or 57, thus completing the printing routine of a letter with two forms, when it is in the body of the word.

According to another embodiment of the invention, another portion 89 of the ROM 39 (FIG. 2) records another printing sign which has no corresponding code combination for the transmission. In particular, the portion 89 records a sign adapted to be placed on the letter lam represented by the numeral 91 in FIG. 5, when this letter is followed by the letter alef 92, to obtain the syllable lam-alef 97. In a portion 94 of the ROM 39, a back space instruction is also recorded, to cause the head 44 to return one space toward the right, in a known manner. Furthermore, the RAM 38 comprises a one bit register 96 for storing the occurred printing of the letter lam 91. Finally, in the ROM 39 a microprogramme routine is recorded for controlling the printing of the syllable lam-alef 97. This microprogramme routine is executed in the following way:

The reading operation 59 (FIG. 7) of the memory 16 is followed by a first logic decision 98 to establish whether the code so read is an alef 92 (FIG. 5). In the negative case, another logic decision 99 (FIG. 7) follows to establish whether the code so read is a lam 91. If also this logic decision 99 gives a negative result, the operation 70 is effected, in which the portion 60 (FIG. 2) corresponding to the code so read is addressed in the ROM 39, whereby the printer 18 (FIG. 1) prints the corresponding character, without further consequence.

On the contrary, if the decision 99 (FIG. 7) gives a positive result, besides the printing of the character lam 91 (FIG. 5) an operation 100 (FIG. 7) is effected and the register 96 (FIG. 2) is set. In case the next following code read in the memory 16 (FIG. 1) is not the alef 92 (FIG. 5) and is not the lam 91, such code, besides causing the operation 70 to address the relevant portion 60 of the ROM 39 (FIG. 2), causes an operation 101 (FIG. 7) for resetting the register 96.

If a code read in the memory 16 (FIG. 1) is the alef 92 (FIG. 5), the positive result of the logic decision 98 (FIG. 7) causes another logic decision 102 to establish whether the register 96 (FIG. 2) has been set or not. In the negative case, the operation 70 (FIG. 7) addresses the corresponding portion 60 of the ROM 38 (FIG. 2) to control the printing of the character 92 (FIG. 5). Finally, if the logic decision 102 (FIG. 7) gives a positive result, an operation 103 is effected to address the portion 94 of the ROM 39, whereby the head 44 (FIG. 4) is back spaced to the right.

Thereafter, an operation 104 (FIG. 7) is effected to substitute the address of the portion 60 with the one of the portion 89 of the ROM 39 (FIG. 2), whereby, following the operation 70 (FIG. 7), the head 44 prints the inclined sign indicated by 105 in FIG. 5 in the same space of the lam 91 previously printed, forming thus the composite character of the syllable lam-alef 97. From what has been seen it results that no key is necessary either for the lam-alef sign (FIG. 5) or for the modified sign 105. (The isolated characters lam 91 and alef 92 and the composite character lam-alef 97 are clearly illustrated in FIG. 6). Finally, the operation 104 (FIG. 7) is followed by the reset operation 101 of the register 96 of the RAM 38 (FIG. 2), whereby the syllable printing routine is completed.

The two above described routines can be executed in a similar way in case the unit 17 controls a display, instead of the printer 18, whereby no further description is necessary.

It is therefore clear that both in the case of the long letters at end of the word, and in the case of syllables, no additional code is requested, besides those of the short letters and of the individual letters of the syllable. It is also clear that the operator sets only the coded letters and the apparatus processes and transmits only these codes, forgetting completely the additional signs or tails and the composite characters. There is thus obtained an operative and constructive simplification, as well as a complete compatibility of the device with the conventional processing and transmission systems.

It is intended that various modifications, improvements and additions of parts can be made to the described teleprinter without departing from the scope of the invention. For instance, the printing of the long form of the letters of groups 51 and 52 of FIG. 5 can be executed, rather than following the output of the spacing code, following the output of the other printing or function codes, such as the full stop printing code or the codes of the tabulation functions, carriage-return etc. Moreover, the device can be used to obtain other syllable or bound characters.

Finally, the device can embody other types of impact or non-impact printers, in which the characters can be selected by mechanic, electric or electronic means.

What we claim is:

1. A bialphabetic teleprinter for texts in alphabets of latin and arabic characters, including an alphanumeric keyboard 10 selectively conditionable for setting up texts in both said alphabets, signal generating means 11 for generating signals corresponding to characters and machine functions, a printer 18 controlled by said signals for printing selectively in either of said two alphabets, and letter spacing means 115 for letter spacing said printer from left to right when printing in latin alphabet and from right to left when printing in arabic alphabet, wherein the improvement includes:

alphabet selecting means 116, 148 conditionable to cause the said keyboard to set characters in a selected one of said alphabets and said printer to operate both in sending and receiving according to said selected one of said alphabets, recognizing means 144, 147 for recognizing predetermined sequences of said signals for selectively conditioning said alphabet selecting means, and direction selecting means 12 conditioned by said recognizing means for causing said spacing means to accordingly select the direction of letter spacing movement.

2. A teleprinter according to claim 1, comprising a pair of answer back devices associated with said alphabets and selectively operable in connecting the teleprinter according to either of said alphabets, and means for automatically generating said sequence in response to the alphabet which has been selected in connecting the teleprinter.

3. A teleprinter according to claim 1, wherein said sequences are formed of a plurality of characters settable by the operator and corresponding to each of the two alphabets, said recognizing means including sensing means cyclically controlled according to a predetermined programme in response either to the connection of the teleprinter to the network or its switching to operate off line.

4. A teleprinter according to claim 1, wherein the keys of said keyboard bear the symbols of both alphabets, so that the two keyboards are superimposed in a single layout, and including encoding means for encoding the keyboard signals according to the alphabet selected each time.

5. A teleprinter according to claim 4, including a dot printer, and means for generating the characters to be printed in response to the received encoded signals, according to the alphabet selected each time.

6. A teleprinter according to claim 1, including a carriage controlled by said spacing means for causing the relative letter spacing of said printer with respect to the printing support, and means controlled by said recognizing means for bringing said carriage to the left end of the printing line when a latin alphabet connection occurs and to the right end of the printing line when the arabic alphabet connection occurs.

7. A display or text printing device for characters of an arabic language group alphabet comprising signal generating means 11 for generating input signals for defining individual corresponding characters, output means 16 responsive to said input signals for generating an output to cause the printing of said characters, and logic means 12 for modifying a predetermined input signal in response to an input signal of a character of a group of characters which in the text immediately precedes said predetermined input signal, wherein the improvement includes memory means 56, 57, 96 comprised in said logic means for storing the occurred output of predetermined characters, and substitution means 78, 79, 103 conditioned by said memory means when storing said occurred output for substituting for said predetermined input signal the signal corresponding to an additional character.

8. A device according to claim 7, wherein said signals address a character generating memory, and wherein said character generating memory comprises at least a portion for generating said additional character.

9. A device according to claim 8 comprising a central unit for causing said memory means to store said occurred output, means for recognizing said predetermined input signal and adapted to be controlled by said central unit for causing said substitution means to be conditioned by said memory means so as to generate the signal corresponding to said additional character, said central unit controlling said recognizing means in executing instructions furnished by a programme memory.

10. A device according to claim 7, wherein said predetermined signal corresponds to a character indicative of the end of the word, and wherein said additional character is formed of a sign bound to the preceding character, whereby the same input signal generates a different output according to whether the preceding character is placed in the body of the word or at the end of the word.

11. A device according to claim 10, wherein said indicative character is constituted by a space between the words, said bound sign occupying a portion of said space.

12. A device according to claim 10, wherein at least two groups of said predetermined characters are provided, said memory means comprising for each group of characters a register to store the occurred output of one of the characters of the group, each register being adapted to condition said substitution means so as to cause the generation of a signal corresponding to a bound sign associated to each register.

13. A device according to claim 12, wherein each character of each one of said groups terminate with an end in a predetermined position to be bound with the end of said bound sign.

14. A device according to claim 7, wherein said predetermined input signal corresponds to a bound syllable portion, comprising command means for commanding a partial return of the display or writing point before the output of said syllable portion.

15. A device according to claim 14, wherein said command means are adapted to command the back space of said display or writing point.

16. A device according to claim 8, wherein said character generating memory controls a dot printer head according to a 9 × 7 dot matrix, said head being able to be letter spaced upon printing each character according to a constant spacing.

17. A device according to claim 16, characterized in that said device is embodied in a printer of a teleprinter, said input signals being encoded according to 5 bit codes, said signal corresponding to an additional character including an address of said character generating memory, said address being generated only at the instant of the printing, whereby it is not transmitted in line.

* * * * *